United States Patent
Matoba et al.

(10) Patent No.: US 10,350,140 B2
(45) Date of Patent: Jul. 16, 2019

(54) LAMINATE FILM, OUTER PACKAGING BAG FOR TRANSFUSION BAG, AND TRANSFUSION BAG PACKAGING BODY

(71) Applicant: MITSUI CHEMICALS TOHCELLO, INC., Chiyoda-ku, Tokyo (JP)

(72) Inventors: Daisuke Matoba, Utsunomiya (JP); Masako Kidokoro, Koga (JP); Akira Nomoto, Koga (JP); Aiko Shimakage, Oyama (JP)

(73) Assignee: MITSUI CHEMICALS TOHCELLO, INC., Chiyoda-Ku, Tokyo (JP)

( * ) Notice: Subject to any disclaimer, the term of this patent is extended or adjusted under 35 U.S.C. 154(b) by 112 days.

(21) Appl. No.: 15/515,659

(22) PCT Filed: Sep. 29, 2015

(86) PCT No.: PCT/JP2015/077421
§ 371 (c)(1),
(2) Date: Mar. 30, 2017

(87) PCT Pub. No.: WO2016/052456
PCT Pub. Date: Apr. 7, 2016

(65) Prior Publication Data
US 2017/0297793 A1    Oct. 19, 2017

(30) Foreign Application Priority Data
Oct. 3, 2014    (JP) .................. 2014-205033

(51) Int. Cl.
*A61J 1/10*    (2006.01)
*B32B 1/02*    (2006.01)
(Continued)

(52) U.S. Cl.
CPC . *A61J 1/00* (2013.01); *A61J 1/10* (2013.01); *B32B 1/02* (2013.01); *B32B 9/005* (2013.01);
(Continued)

(58) Field of Classification Search
CPC ........ B65D 65/40; B65D 65/42; B65D 77/04; B32B 1/02; B32B 9/005; B32B 27/08; A61J 1/10
See application file for complete search history.

(56) References Cited

U.S. PATENT DOCUMENTS 5,770,301 A * 6/1998 Murai ............... B32B 27/08
428/213
5,799,463 A * 9/1998 Kashiba ............ B65D 81/266
53/400
2014/0004284 A1    1/2014 Inaba et al.

FOREIGN PATENT DOCUMENTS

EP    2 682 092 A1    1/2014
JP    05-338072 A    12/1993
(Continued)

OTHER PUBLICATIONS

International Search Report (PCT/ISA/210) dated Jan. 12, 2016, by the Japanese Patent Office as the International Searching Authority for International Application No. PCT/JP2015/077421.
(Continued)

*Primary Examiner* — Walter Aughenbaugh
(74) *Attorney, Agent, or Firm* — Buchanan, Ingersoll & Rooney PC

(57) ABSTRACT

A laminate film includes a substrate layer; and a metal oxide layer which is provided on one surface or both surfaces of the substrate layer and contains a metal oxide. Further, the oxygen permeability measured under defined conditions is 20 ml/m²·day·MPa or less and the water vapor permeability measured under conditions of a temperature of 40° C. and a humidity of 90% RH is 2.5 g/m²·day or greater. In addition, when the Kα beam intensity of a metal constituting the metal oxide which is obtained by performing fluorescence X-ray analysis on the metal oxide layer is set to A and the Kα beam intensity of the metal which is obtained by
(Continued)

performing fluorescence X-ray analysis on a metal layer formed of the metal constituting the metal oxide is set to B, A/B is equal to or greater than 0.20 and equal to or less than 0.97.

9 Claims, 1 Drawing Sheet

(51) Int. Cl.
| | |
|---|---|
| *B65D 77/04* | (2006.01) |
| *A61J 1/00* | (2006.01) |
| *B65D 65/42* | (2006.01) |
| *B32B 27/08* | (2006.01) |
| *B65D 65/40* | (2006.01) |
| *B32B 9/00* | (2006.01) |
| *B32B 27/06* | (2006.01) |
| *C08J 7/04* | (2006.01) |
| *C08J 7/06* | (2006.01) |

(52) U.S. Cl.
CPC ............ *B32B 27/06* (2013.01); *B32B 27/08* (2013.01); *B65D 65/40* (2013.01); *B65D 65/42* (2013.01); *B65D 77/04* (2013.01); *C08J 7/045* (2013.01); *C08J 7/06* (2013.01); *B32B 2439/80* (2013.01); *C08J 2323/08* (2013.01); *C08J 2367/02* (2013.01); *C08J 2427/08* (2013.01); *C08J 2429/04* (2013.01); *C08J 2433/02* (2013.01); *C08J 2475/04* (2013.01)

(56) References Cited

FOREIGN PATENT DOCUMENTS

| | | |
|---|---|---|
| JP | 05-338073 A | 12/1993 |
| JP | 05-339704 | 12/1993 |
| JP | 07-080986 A | 3/1995 |
| JP | 09-143690 A | 6/1997 |
| JP | 10-006429 A | 1/1998 |
| JP | 2008-008316 A | 1/2008 |
| JP | 2008-201482 A | 9/2008 |
| JP | 2008-213200 A | 9/2008 |
| JP | 2012-179248 A | 9/2012 |

OTHER PUBLICATIONS

Written Opinion (PCT/ISA/237) dated Jan. 12, 2016, by the Japanese Patent Office as the International Searching Authority for International Application No. PCT/JP2015/077421.

\* cited by examiner

LAMINATE FILM, OUTER PACKAGING BAG FOR TRANSFUSION BAG, AND TRANSFUSION BAG PACKAGING BODY

TECHNICAL FIELD

The present invention relates to a laminate film, an outer packaging bag for transfusion bag, and a transfusion bag packaging body.

BACKGROUND ART

In a case where the contents of a medical transfusion bag contains amino acids or vitamins, the transfusion bag is occasionally packaged using a barrier film having a low oxygen permeability in order to prevent deterioration of the components. At this time, when a barrier film on which an inorganic deposited film is laminated is used, excellent oxygen barrier properties and water vapor barrier properties can be exhibited.

For example, a technique described in Patent Document 1 (Japanese Unexamined Patent Publication No. H07-80986) may be exemplified as a technique related to such a barrier film on which an inorganic deposited film is laminated.

Patent Document 1 describes a gas barrier film formed by coating a substrate film layer with a barrier resin coating layer through an inorganic layer having transparency. Patent Document 1 describes that such a gas barrier film suppresses deterioration of gas barrier properties due to an action of mechanical force and has excellent gas barrier properties in addition to the transparency at a high temperature even when the coated layer is thin.

RELATED DOCUMENT

Patent Document

[Patent Document 1] Japanese Unexamined Patent Publication No. H07-80986

SUMMARY OF THE INVENTION

According to the examination of the present inventors, when a barrier film on which an inorganic deposited film is laminated, as described in Patent Document 1, is used as an outer packaging bag that packages a transfusion bag main body, it became evident that water vapor remains between the transfusion bag main body and the outer packaging bag packaging the transfusion bag main body, the water vapor changes the storage environment or condenses during the transportation, and water droplets may be generated inside because such a barrier film has low water vapor permeability. In such a state, breakage or leakage is suspected and thus the transfusion bag becomes unusable.

Further, a film which has moderate water vapor permeability and is formed of polyvinyl alcohol (hereinafter, also referred to as "PVA") or an ethylene-vinyl alcohol resin (hereinafter, also referred to as "EVOH") has been examined as the outer packaging bag that packages the transfusion bag main body. However, it became evident that such a film is capable of suppressing the generation of water droplets, but the oxygen permeability of the outer packaging bag becomes high at a high humidity.

The present invention has been made in consideration of the above-described circumstances and an object thereof is to provide a laminate film having excellent water vapor permeability and excellent oxygen barrier properties even at a high humidity, an outer packaging bag for a transfusion bag using the laminate film, and a transfusion bag packaging body having excellent storage stability.

According to the present invention, there are provided a laminate film, an outer packaging bag for a transfusion bag, and a transfusion bag packaging body described below.

[1]

A laminate film including: a substrate layer; and a metal oxide layer which is provided on one surface or both surfaces of the substrate layer and contains a metal oxide, in which the oxygen permeability measured under conditions of a temperature of 20° C. and a humidity of 90% RH in conformity with JIS K 7126-2:2006 is 20 ml/m$^2$·day·MPa or less and the water vapor permeability measured under conditions of a temperature of 40° C. and a humidity of 90% RH is 2.5 g/m$^2$·day or greater, and when the Kα beam intensity of a metal constituting the metal oxide which is obtained by performing fluorescence X-ray analysis on the metal oxide layer is set to A and the Kα beam intensity of the metal which is obtained by performing fluorescence X-ray analysis on a metal layer formed of the metal constituting the metal oxide is set to B, A/B is equal to or greater than 0.20 and equal to or less than 0.97.

[2]

The laminate film according to [1], in which the metal oxide layer is an aluminum oxide layer, and when the Kα beam intensity of aluminum which is obtained by performing fluorescence X-ray analysis on the aluminum oxide layer is set to $A_1$ and the Kα beam intensity of aluminum which is obtained by performing fluorescence X-ray analysis on an aluminum layer formed of the aluminum is set to $B_1$, $A_1/B_1$ is equal to or greater than 0.20 and equal to or less than 0.75.

[3]

The laminate film according to [2], in which the thickness of the aluminum oxide layer is in a range of equal to or greater than 1 nm and equal to or less than 40 nm.

[4]

The laminate film according to [1], in which the metal oxide layer is a silicon oxide layer, and when the Kα beam intensity of silicon which is obtained by performing fluorescence X-ray analysis on the silicon oxide layer is set to $A_2$ and the Kα beam intensity of silicon which is obtained by performing fluorescence X-ray analysis on a silicon layer formed of the silicon is set to $B_2$, $A_2/B_2$ is equal to or greater than 0.75 and equal to or less than 0.97.

[5]

The laminate film according to [4], in which the thickness of the silicon oxide layer is in a range of equal to or greater than 10 nm and equal to or less than 35 nm.

[6]

The laminate film according to any one of [1] to [5], in which the Kα beam intensity A is equal to or greater than 12 kcps and equal to or less than 40 kcps.

[7]

The laminate film according to any one of [1] to [6], in which a resin layer is further provided on the metal oxide layer.

[8]

The laminate film according to [7], in which the resin layer contains one or two or more resins selected from the group consisting of a polyvinyl alcohol-based resin, a urethane-based resin, a polycarboxylic acid-based resin, a polyvinylidene chloride-based resin, and a resin formed of a polyvinyl alcohol-based resin and a polycarboxylic acid polyvalent metal salt-based resin.

[9]

The laminate film according to any one of [1] to [8] which is used for an outer packaging bag for a transfusion bag.

[10]

An outer packaging bag for a transfusion bag which is obtained by using the laminate film according to any one of [1] to [9].

[11]

A transfusion bag packaging body including: a transfusion bag main body; and the outer packaging bag for a transfusion bag according to [10] which packages the transfusion bag main body.

According to the present invention, it is possible to provide a laminate film having excellent water vapor permeability and excellent oxygen barrier properties even at a high humidity, an outer packaging bag for a transfusion bag using the laminate film, and a transfusion bag packaging body having excellent storage stability.

BRIEF DESCRIPTION OF THE DRAWINGS

The above-described object and other objects, and features and advantages will become more evident from preferred embodiments described below and the accompanying drawings.

DESCRIPTION OF EMBODIMENTS

Figure 1:
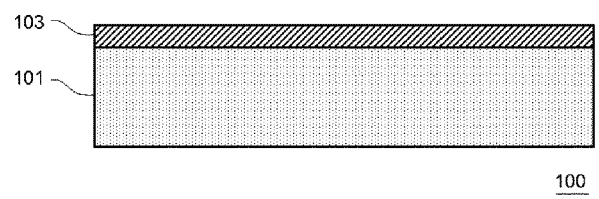
FIG. 1 is a cross-sectional view schematically illustrating an example of a structure of a laminate film according to an embodiment of the present invention.

Hereinafter, embodiments of the present invention will be described with reference to the drawings. Further, the same constituent elements are denoted by the same reference numerals in all drawings and the description thereof will not be repeated. Further, the drawings are schematic views and do not necessarily match the actual dimension ratios. In addition, the numerical values before and after "to" represent the lower limits and the upper limits unless otherwise noted.

FIG. 1 is a cross-sectional view schematically illustrating an example of a structure of a laminate film 100 according to an embodiment of the present invention.

The laminate film 100 includes a substrate layer 101; and a metal oxide layer 103 which is provided on one surface or both surfaces of the substrate layer 101 and contains a metal oxide. Further, the oxygen permeability measured under conditions of a temperature of 20° C. and a humidity of 90% RH in conformity with JIS K 7126-2:2006 is 20 ml/m$^2$·day·MPa or less, preferably 15 ml/m$^2$·day·MPa or less, more preferably 10 ml/m$^2$·day·MPa or less, still more preferably 8 ml/m$^2$·day·MPa or less, and particularly preferably 5 ml/m$^2$·day·MPa or less and the water vapor permeability measured under conditions of a temperature of 40° C. and a humidity of 90% RH is 2.5 g/m$^2$·day or greater, preferably 3.0 g/m$^2$·day or greater, more preferably 3.5 g/m$^2$·day or greater, still more preferably 4.0 g/m$^2$·day or greater, and particularly preferably 5.0 g/m$^2$·day or greater. In addition, when the Kα beam intensity of a metal constituting the metal oxide which is obtained by performing fluorescence X-ray analysis on the metal oxide layer 103 is set to A and the Kα beam intensity of the metal which is obtained by performing fluorescence X-ray analysis on a metal layer formed of the metal constituting the metal oxide is set to B, A/B (hereinafter, also referred to as an adhesion ratio M) is equal to or greater than 0.20 and equal to or less than 0.97 and preferably equal to or greater than 0.20 and equal to or less than 0.94.

Here, the metal layer is a metal layer obtained under production conditions which are the same as those for the metal oxide layer 103 except that oxygen is not introduced. That is, the adhesion ratio M indicates a ratio between numbers of atoms in the same type of metal which are present in each portion of the metal oxide layer and the metal layer from which the Kα beam intensity is to be measured by fluorescence X-ray analysis.

Such a laminate film 100 has excellent water vapor permeability. Since an outer packaging bag for a transfusion bag using the laminate film 100 has excellent water vapor permeability, moisture having permeated into the outer packaging bag from a transfusion bag main body can be released to the outside of the outer packaging bag. In this manner, it is possible to prevent water vapor from remaining between the transfusion bag main body and the outer packaging bag packaging the transfusion bag main body. As the result, it is possible to prevent water droplets from being generated inside during storage of the transfusion bag packaging body.

Further, the laminate film 100 has excellent oxygen barrier properties even at a high humidity. Since the outer packaging bag for a transfusion bag using the laminate film 100 has excellent oxygen barrier properties even at a high humidity, it is possible to suppress deterioration of the contents in the transfusion bag due to oxygen entering the transfusion bag main body at a high humidity.

According to the laminate film 100 of the present embodiment described above, it is possible to obtain a transfusion bag packaging body having excellent storage stability.

Hereinafter, each member constituting the laminate film 100 will be described.

(Substrate Layer)

The substrate layer 101 of the present embodiment is typically configured of a sheet-like or film-like substrate formed of a thermoplastic resin. As the thermoplastic resin, known thermoplastic resins can be used. For example, one or two or more kinds selected from polyolefin (polyethylene, polypropylene, poly(4-methyl-1-pentene), poly(1-butene), or the like), polyester (polyethylene terephthalate, polybutylene terephthalate, or polyethylene naphthalate), polyamide (nylon-6, nylon-66, or polymetaxylene adipamide), polyvinyl chloride, polyimide, an ethylene-vinyl acetate copolymer, polyacrylonitrile, polycarbonate, polystyrene, and an ionomer may be used.

Among the examples described above, from the viewpoints of excellent stretchability and transparency, polypropylene, polyethylene terephthalate, polybutylene terephthalate, polyethylene naphthalate, and polyamide are preferable.

In addition, the film-like substrate formed of a thermoplastic resin may be a non-stretched film or a stretched film.

Further, one surface or both surfaces of the substrate layer 101 may be subjected to a surface activation treatment such as a corona treatment, a flame treatment, a plasma treatment, or a primer coating treatment in order to improve the adhesiveness of the substrate layer to the metal oxide layer 103.

The thickness of the substrate layer 101 is typically in a range of 1 to 200 μm and preferably in a range of 5 to 150 μm.

From the viewpoint of static electricity removal or the surface treatment performed on the substrate layer 101, a plasma treatment may be performed immediately after unwinding of a substrate in a vapor deposition vessel. Examples of a method of generating plasma include DC glow discharge, high frequency discharge, and microwave discharge. In addition, it is necessary to introduce a gas for these methods of discharge. Various gases typically used for the discharge can be used as the gas and examples thereof include argon, helium, oxygen, and nitrogen.

(Metal Oxide Layer)

The metal oxide constituting the metal oxide layer 103 of the present embodiment is, for example, a metal oxide which is capable of forming a transparent thin film. Examples of the metal oxide constituting the metal oxide layer 103 include oxides, for example, the Group 2A elements in the periodic table such as beryllium, magnesium, calcium, strontium, and barium; transition elements in the periodic table such as titanium, zirconium, ruthenium, hafnium, and tantalum; the Group 2B elements in the periodic table such as zinc; the Group 3A elements in the periodic table such as aluminum, gallium, indium, and thallium; the Group 4A elements in the periodic table such as silicon, germanium, and tin; and the Group 6A elements in the periodic table such as selenium and tellurium. These can be used alone or in combination of two or more kinds thereof.

In the present embodiment, the group names in the periodic table are based on the old-style CAS.

Among the metal oxides, from the viewpoint of excellent transparency, aluminum oxide or silicon oxide is preferable.

Further, silicon oxide may contain silicon monoxide and silicon suboxide in addition to silicon dioxide.

The metal oxide layer 103 of the present embodiment is formed of a metal oxide. The metal oxide layer 103 may be configured of a single layer of a metal oxide layer or a plurality of layers of metal oxide layers. Further, in a case where the metal oxide layer 103 is configured of a plurality of layers, the metal oxide layer 103 may be configured of the same type of metal oxide layer or different types of metal oxide layers.

In the laminate film 100 of the present embodiment, the adhesion ratio M represented by A/B is equal to or greater than 0.20 and equal to or less than 0.97 and preferably equal to or greater than 0.20 and equal to or less than 0.94.

Here, the above-described A indicates Kα beam intensity of the metal constituting the metal oxide which is obtained by performing fluorescence X-ray analysis on the metal oxide layer 103. In addition, the above-described B indicates Kα beam intensity of the metal which is obtained by performing fluorescence X-ray analysis on a metal layer formed of the metal constituting the metal oxide.

When the adhesion ratio M is equal to or greater than 0.20, the production efficiency of the laminate film 100 can be improved and the transparency of the laminate film 100 to be obtained can be improved. When the adhesion ratio M is equal to or less than 0.97 and preferably equal to or less than 0.94, the transparency of the laminate film 100 becomes excellent.

A laminate film in which the oxygen permeability measured under conditions of a temperature of 20° C. and a humidity of 90% RH in conformity with JIS K 7126-2:2006 is 20 ml/m$^2$·day·MPa or less and the water vapor permeability measured under conditions of a temperature of 40° C. and a humidity of 90% RH is 2.5 g/m$^2$·day or greater can be obtained by setting the adhesion ratio M to be in the above-described range and controlling the thickness of the metal oxide layer.

Further, desired oxygen permeability and water vapor permeability can be obtained by setting the thickness of the metal oxide layer 103 to be in a suitable range according to the value of the adhesion ratio M. Typically, the thickness of the metal oxide layer 103 is set to be small when the adhesion ratio M is large and the thickness of the metal oxide layer 103 is set to be large when the adhesion ratio M is small. When the adhesion ratio M is large, since particles of the metal oxide to be deposited on the surface of the substrate layer 101 become small so that a relatively dense surface structure is formed, the thickness of the metal oxide layer needs to be small from the viewpoint of obtaining desired water vapor permeability. Meanwhile, when the adhesion ratio M is small, since particles of the metal oxide to be deposited on the surface of the substrate layer become large so that a relatively rough surface structure is formed, the thickness of the metal oxide layer needs to be large from the viewpoint of obtaining desired oxygen barrier properties.

In other words, from the viewpoint of lowering the oxygen permeability, it is preferable that the thickness of the metal oxide layer 103 is set to be large as the adhesion ratio M is smaller. Further, from the viewpoint of improving the water vapor permeability, it is preferable that the thickness of the metal oxide layer 103 is set to be small as the adhesion ratio M is larger.

The above-described Kα beam intensity A is obtained by the following method.

The Kα beam of the metal constituting the metal oxide is measured with respect to the metal oxide layer 103 of the laminate film 100 of the present embodiment using a fluorescence X-ray analyzer ZSX Primus II (manufactured by Rigaku Corporation) and then the obtained fluorescence X-ray intensity can be set as the Kα beam intensity A (kcps).

The above-described Kα beam intensity B is obtained by the following method.

First, a metal layer formed of the metal constituting the metal oxide is formed on a substrate under the same production conditions as those for the metal oxide layer 103 of the laminate film 100 according to the present embodiment without performing introduction of oxygen. Next, the Kα beam of the metal constituting the metal layer is measured with respect to the obtained metal layer using a fluorescence X-ray analyzer ZSX Primus II (manufactured by Rigaku Corporation) and then the obtained fluorescence X-ray intensity can be set as the Kα beam intensity B (kcps).

In the present embodiment, the thickness of the metal oxide layer 103 of the laminate film 100 can be acquired by observation images obtained using a transmission electron microscope or a scanning electron microscope.

Further, in the present embodiment, the thickness of the metal oxide layer 103 of the laminate film 100 can be acquired by converting the Kα beam intensity A if a calibration curve showing the relationship between the thickness of the metal oxide layer and the Kα beam intensity is created in advance in a case of the metal oxide layer with the same adhesion ratio M.

In the laminate film 100 of the present embodiment, the Kα beam intensity A is preferably equal to or greater than 12 kcps and equal to or less than 40 kcps and more preferably equal to or greater than 15 kcps and equal to or less than 35 kcps. When the Kα beam intensity A is in the above-described range, the laminate film 100 in which the balance between the water vapor permeability and the oxygen barrier properties is excellent is obtained.

Such a Kα beam intensity A can be obtained by, for example, adjusting the thickness or the adhesion ratio M of the metal oxide layer 103.

(Aluminum Oxide Layer)

As the metal oxide layer 103, an aluminum oxide layer containing aluminum oxide as a metal oxide is preferable.

Further, when the Kα beam intensity of aluminum which is obtained by performing fluorescence X-ray analysis on the aluminum oxide layer is set to $A_1$ and the Kα beam intensity of aluminum which is obtained by performing fluorescence X-ray analysis on an aluminum layer formed of the aluminum is set to $B_1$, $A_1/B_1$ (hereinafter, also referred to as an adhesion ratio Al) is preferably equal to or greater than 0.20 and equal to or less than 0.75, more preferably equal to or greater than 0.20 and equal to or less than 0.65, still more preferably equal to or greater than 0.20 and equal to or less than 0.60, even still more preferably equal to or greater than 0.20 and less than 0.55, even still more preferably equal to or greater than 0.25 and less than 0.55, even still more preferably equal to or greater than 0.30 and less than 0.55, even still more preferably equal to or greater than 0.30 and equal to or less than 0.50, even still more preferably equal to or greater than 0.35 and equal to or less than 0.50, and particularly preferably equal to or greater than 0.40 and equal to or less than 0.50, from the viewpoints of ease of controlling the thickness of the metal oxide layer 103, the transparency of the laminate film 100 to be obtained, and production efficiency of the laminate film 100.

Here, the aluminum layer is an aluminum layer obtained under production conditions which are the same as those for the aluminum oxide layer except that oxygen is not introduced. That is, the adhesion ratio Al indicates a ratio between numbers of aluminum atoms which are present in portions of the aluminum oxide layer and the aluminum layer from which the Kα beam intensity is to be measured by fluorescence X-ray analysis.

In a case where the metal oxide layer 103 is an aluminum oxide layer and the adhesion ratio Al is in the above-described range, the thickness of the metal oxide layer 103 is preferably equal to or greater than 1 nm and equal to or less than 40 nm, more preferably equal to or greater than 3 nm and equal to or less than 35 nm, still more preferably equal to or greater than 5 nm and equal to or less than 30 nm, and even still more preferably equal to or greater than 7 nm and equal to or less than 25 nm, from the viewpoint of the balance between the water vapor permeability and oxygen barrier properties.

In the laminate film 100 of the present embodiment, the Kα beam intensity $A_1$ is preferably equal to or greater than 12 kcps and equal to or less than 40 kcps and more preferably equal to or greater than 15 kcps and equal to or less than 35 kcps. When the Kα beam intensity $A_1$ is in the above-described range, the laminate film 100 in which the balance between the water vapor permeability and the oxygen barrier properties is excellent is obtained.

Such a Kα beam intensity $A_1$ can be obtained by, for example, adjusting the thickness or the adhesion ratio Al of the aluminum oxide layer.

(Silicon Oxide Layer)

As the metal oxide layer 103, a silicon oxide layer containing silicon oxide as a metal oxide is preferable.

Further, when the Kα beam intensity of silicon which is obtained by performing fluorescence X-ray analysis on the silicon oxide layer is set to $A_2$ and the Kα beam intensity of silicon which is obtained by performing fluorescence X-ray analysis on a silicon layer formed of the silicon is set to $B_2$, $A_2/B_2$ (hereinafter, also referred to as an adhesion ratio Si) is preferably equal to or greater than 0.75 and equal to or less than 0.97, more preferably equal to or greater than 0.75 and equal to or less than 0.95, still more preferably equal to or greater than 0.75 and equal to or less than 0.94, even still more preferably equal to or greater than 0.80 and less than 0.94, even still more preferably equal to or greater than 0.85 and less than 0.94, even still more preferably equal to or greater than 0.88 and less than 0.94, and particularly preferably equal to or greater than 0.90 and equal to or less than 0.94, from the viewpoints of ease of controlling the thickness of the metal oxide layer 103, the transparency of the laminate film 100 to be obtained, and production efficiency of the laminate film 100.

Here, the silicon layer is a silicon layer obtained under production conditions which are the same as those for the silicon oxide layer except that oxygen is not introduced. That is, the adhesion ratio Si indicates a ratio between numbers of Si atoms which are present in portions of the silicon oxide layer and the silicon layer from which the Kα beam intensity is to be measured by fluorescence X-ray analysis.

In a case where the metal oxide layer 103 is a silicon oxide layer and the adhesion ratio Si is in the above-described range, the thickness of the metal oxide layer 103 is preferably equal to or greater than 10 nm and equal to or less than 35 nm, more preferably equal to or greater than 15 nm and equal to or less than 30 nm, and still more preferably equal to or greater than 17 nm and equal to or less than 25 nm, from the viewpoint of the balance between the water vapor permeability and oxygen barrier properties.

In the laminate film 100 of the present embodiment, the Kα beam intensity $A_2$ is preferably equal to or greater than 12 kcps and equal to or less than 40 kcps, more preferably equal to or greater than 15 kcps and equal to or less than 35 kcps, still more preferably equal to or greater than 20 kcps and equal to or less than 35 kcps, even still more preferably equal to or greater than 25 kcps and equal to or less than 35 kcps, and particularly preferably equal to or greater than 28 kcps and equal to or less than 33 kcps. When the Kα beam intensity $A_2$ is in the above-described range, the laminate film 100 in which the balance between the water vapor permeability and the oxygen barrier properties is excellent is obtained.

Such a Kα beam intensity $A_2$ can be obtained by, for example, adjusting the thickness or the adhesion ratio Si of the silicon oxide layer.

(Resin Layer)

In the laminate film 100 of the present embodiment, a resin layer may be provided on the metal oxide layer 103 from the viewpoint of protecting the metal oxide layer 103 or improving oxygen barrier properties.

The resin layer may include one or two or more kinds of resins selected from an olefin resin, a polyester resin, a urethane-based resin, a modified olefin resin modified with acrylic acid or acrylic salts, a nylon resin, a modified nylon resin modified by an aromatic ring being incorporated in a nylon skeleton or water solubilization, an epoxy resin, a melamine resin, a polyvinyl alcohol-based resin, a polyvinylidene chloride-based resin, a polyacrylonitrile resin, a polycarboxylic acid polyvalent metal salt-based resin, a polycarboxylic acid-based resin, a resin formed of a polyvinyl alcohol-based resin and a polycarboxylic acid polyvalent metal salt-based resin, and an organic silicon coating resin obtained by using a sol-gel method of hydrolyzing and crosslinking tetraethoxysilane (TEOS) or tetramethoxysilane (TMOS).

Among the examples described above, from the viewpoints of improving production efficiency and oxygen barrier properties and ensuring water vapor permeability, it is preferable that the resin layer may include one or two or more kinds of resins selected from the group consisting of a polyvinyl alcohol-based resin, a urethane-based resin, a polycarboxylic acid-based resin, a polyvinylidene chloride-based resin, and a resin formed of a polyvinyl alcohol-based resin and a polycarboxylic acid polyvalent metal salt-based resin.

A single layer formed of one kind of resin or a plurality of layers formed of two or more kinds of resins may be provided as the resin layer.

Examples of a method of forming the resin layer include a method of forming a resin layer by laminating a resin film on the metal oxide layer 103 and a method of forming a resin layer by coating the metal oxide layer 103 with a resin solution obtained by dissolving or dispersing a resin in a solvent and then curing the solution. Among these, from the viewpoint of workability, a method of forming a resin layer by coating the metal oxide layer 103 with a resin solution and curing the solution is preferable.

(Polyvinyl Alcohol-based Resin)

The polyvinyl alcohol-based resin contains a copolymer of vinyl alcohol and an olefin in addition to a polyvinyl alcohol polymer. The copolymerization amount of the olefin in the copolymer of vinyl alcohol and an olefin is typically in a range of 1% to 25% by mole, preferably in a range of 3% to 20% by mole, and more preferably in a range of 5% to 16% by mole.

Further, the degree of polymerization of the polyvinyl alcohol-based resin is preferably in a range of 100 to 3000, more preferably in a range of 200 to 2500, and particularly preferably in a range of 300 to 2000. When the degree of polymerization is in the above-described range, a polyvinyl alcohol polymer or a polyvinyl alcohol copolymer is easily dissolved in water and can be easily used as an aqueous solution. In this manner, a substrate layer is easily coated with a polyvinyl alcohol-based resin. In addition, stretchability and oxygen barrier properties are improved. Further, an olefin having 4 or less carbon atoms is preferable as the olefin and examples thereof include ethylene, propylene, 1-butene, and isobutene. Among these, ethylene is particularly preferable from the viewpoint of water resistance.

The degree of saponification of a polyvinyl alcohol polymer and a copolymer of vinyl alcohol and an olefin is preferably 90% or greater and more preferably 95% or greater. When the degree of saponification is equal to or greater than the lower limit, a resin layer having excellent oxygen barrier properties is obtained.

(Urethane-based Resin)

The urethane-based resin is a urethane resin having oxygen barrier properties. A water-insoluble resin of the urethane-based resin constitutes an anionic self-emulsifying type polyurethane resin, the total concentration of a urethane group and a urea group is high, and the water-insoluble resin includes an acid group. The urethane-based resin can be obtained by reacting polyhydroxy acid with a polyisocyanate compound containing at least one selected from the group consisting of aromatic polyisocyanate, aromatic aliphatic polyisocyanate, and alicyclic polyisocyanate and is typically neutralized by a neutralizing agent. The urethane-based resin may be a copolymer obtained by reacting the urethane resin with other components and can be obtained by, for example, reacting a polyisocyanate compound that contains 30% by mass or greater of at least one selected from the group consisting of aromatic polyisocyanate, aromatic aliphatic polyisocyanate, and alicyclic polyisocyanate, polyhydroxy acid, and at least one component selected from a polyol component and a chain extender component. The polyisocyanate compound may contain at least one selected from xylylene diisocyanate and hydrogenated xylylene diisocyanate. Further, the polyol component may be a polyol compound containing 90% by mass or greater of polyols having 2 to 8 carbon atoms. The chain extender component is at least one selected from a diamine, hydrazine, and a hydrazine derivative.

The total concentration of a urethane group and a urea group of the urethane-based resin is typically in a range of 25% to 60% by mass, preferably in a range of 30% to 55% by mass, more preferably in a range of 35% to 55% by mass, and particularly preferably in a range of 35% to 50% by mass. Further, the concentration of the urethane group or the concentration of the urea group indicates the value obtained by dividing the molecular weight of the urethane group (59 g/eq) or the molecular weight of the urea group (primary amino group (amino group): 58 g/eq, secondary amino group (imino group): 57 g/eq) by the molecular weight of the repeating constituent unit structure. Further, in a case of using a mixture, the concentration of the urethane group and the urea group can be calculated based on preparation of reactive components, that is, based on the proportion of each component to be used.

Examples of the acid group of the urethane-based resin include a carboxyl group and a sulfonic acid group. The acid group may be positioned in the terminal or side chain (particularly preferably the side chain) of a polyurethane resin. The acid group can be neutralized by a neutralizing agent (base) and may form salts together with a base.

The number average molecular weight of the urethane-based resin is typically in a range of 800 to 1000000, preferably in a range of 800 to 200000, and more preferably in a range of 800 to 100000.

It is preferable that the urethane-based resin has excellent gas barrier properties, and the oxygen permeability (unit: $ml/m^2 \cdot day \cdot MPa$, under conditions of a temperature of 20° C. and a humidity of 80% RH) of the urethane-based resin is, for example, equal to or less than 5000, preferably equal to or less than 4000 (for example, in a range of 1000 to 4000), and more preferably equal to or less than 3000 (for example, in a range of 500 to 3000) at a thickness of 1 μm.

Such a urethane-based resin can be obtained by reacting at least a polyisocyanate compound (particularly preferably a diisocyanate compound) with polyhydroxy acid (for example, polyhydroxyalkanoic acid and particularly preferably dihydroxy acid). The urethane-based resin can be obtained by reacting a component of the polyisocyanate compound (particularly preferably a diisocyanate compound), a component of the polyhydroxy acid, and at least one component selected from a polyol component (particularly preferably a diol component such as alkylene glycol) and a chain extender (particularly preferably a bifunctional chain extender).

(Polycarboxylic Acid-based Resin)

Examples of the polycarboxylic acid-based resin include a resin having two or more carboxy groups in a molecule, a copolymer thereof, and a polymer of a polycarboxylic acid polyvalent metal salt. Specific examples thereof include a homopolymer of unconjugated unsaturated carboxylic acid such as 3-hexenoic acid or 3-hexenedioic acid or a copolymer of these, and a copolymer with esters such as ethyl ester or olefins such as ethylene; and a homopolymer of α,β-unsaturated carboxylic acid such as acrylic acid, methacrylic acid, itaconic acid, fumaric acid, crotonic acid, or cinnamic acid or a copolymer of these, and a copolymer with esters such as ethyl ester or olefins such as ethylene. Among these, a homopolymer of acrylic acid, methacrylic acid, itaconic acid, fumaric acid, crotonic acid, or cinnamic acid or a copolymer of these is preferable and a homopolymer of methacrylic acid or acrylic acid is more preferable. The degree of polymerization of polycarboxylic acid and a polycarboxylic acid polyvalent metal salt polymer is equal to or less than 20.

Further, as the polycarboxylic acid-based resin, a resin formed by polymerizing salts of the polycarboxylic acid and polyvalent metal may be exemplified. As the polyvalent metal, at least one or more kinds from among metals belonging to the Groups 2A to 7A, 1B to 3B, and 8B in the periodic table can be applied. Specific examples thereof include divalent or higher valent metals such as magnesium (Mg), calcium (Ca), strontium (Sr), barium (Ba), iron (Fe), cobalt (Co), nickel (Ni), copper (Cu), zinc (Zn), and aluminum (Al). Among these, magnesium, calcium, barium, or zinc is preferable and zinc is particularly preferable.

(Polyvinylidene Chloride-based Resin)

The polyvinylidene chloride-based resin includes a polyvinylidene chloride resin and a copolymer thereof. The polyvinylidene chloride-based resin is laminated using various methods, and a solvent having an aqueous emulsion and a resin being dissolved therein is preferable from the viewpoint of application. Further, from the viewpoint of adhesiveness, it is more preferable that a solvent having a resin being dissolved therein is applied.

(Resin Formed of Polyvinyl Alcohol-based Resin and Polycarboxylic Acid Polyvalent Metal Salt-based Resin)

A resin layer containing a resin formed of a polyvinyl alcohol-based resin and a polycarboxylic acid polyvalent metal salt-based resin can be formed by mixing the polyvinyl alcohol-based polymer with the polycarboxylic acid polyvalent metal salt-based resin to prepare a coating solution, coating the metal oxide layer 103 with the obtained coating solution, and crosslinking, polymerizing, and curing the resultant.

The polyvinyl alcohol-based resin contains a copolymer of vinyl alcohol and an olefin in addition to a polyvinyl alcohol polymer. The copolymerization amount of the olefin in the copolymer of vinyl alcohol and an olefin is typically in a range of 1% to 25% by mole, preferably in a range of 3% to 20% by mole, and more preferably in a range of 5% to 16% by mole.

Further, the degree of polymerization of the polyvinyl alcohol-based resin is preferably in a range of 100 to 3000, more preferably in a range of 200 to 2500, and particularly preferably in a range of 300 to 2000. Further, an olefin having 4 or less carbon atoms is preferable as the olefin and examples thereof include ethylene, propylene, n-butene, and isobutene. Among these, ethylene is particularly preferable from the viewpoint of water resistance.

The degree of saponification of a polyvinyl alcohol polymer and a copolymer of vinyl alcohol and an olefin is preferably 90% or greater and more preferably 95% or greater. When the degree of saponification is equal to or greater than the lower limit, a resin layer having excellent oxygen barrier properties is obtained.

Further, the polycarboxylic acid polyvalent metal salt-based resin is formed by a divalent or higher valent metal salt being bonded to a polycarboxylic acid-based polymer of a resin having two or more carboxy groups in a molecule and a copolymer thereof. Specific examples of the polycarboxylic acid-based polymer include a homopolymer of unconjugated unsaturated carboxylic acid such as 3-hexenoic acid or 3-hexenedioic acid or a copolymer of these, and a copolymer with esters such as ethyl ester or olefins such as ethylene; and a homopolymer of α,β-unsaturated carboxylic acid such as acrylic acid, methacrylic acid, itaconic acid, fumaric acid, crotonic acid, or cinnamic acid or a copolymer of these, and a copolymer with esters such as ethyl ester or olefins such as ethylene. Among these, a homopolymer of acrylic acid, methacrylic acid, itaconic acid, fumaric acid, crotonic acid, or cinnamic acid or a copolymer of these is preferable and a homopolymer of methacrylic acid or acrylic acid is more preferable. The degree of polymerization of polycarboxylic acid and a polycarboxylic acid polyvalent metal salt polymer is equal to or less than 20.

Further, as the polyvalent metal forming the polycarboxylic acid polyvalent metal salt-based resin, at least one or more kinds from among metals belonging to the Groups 2A to 7A, 1B to 3B, and 8B in the periodic table can be applied. Specific examples thereof include divalent or higher valent metals such as magnesium (Mg), calcium (Ca), strontium (Sr), barium (Ba), iron (Fe), cobalt (Co), nickel (Ni), copper (Cu), zinc (Zn), and aluminum (Al). Among these, magnesium, calcium, barium, or zinc is preferable and zinc is particularly preferable.

(Heat Fusion Layer)

The laminate film of the present embodiment may be provided with a heat fusion layer on at least one surface in order to impart heat-sealing properties.

In a case where the resin layer is not provided on the metal oxide layer 103, it is preferable that a heat fusion layer is provided on the metal oxide layer 103. Further, in a case where a resin layer is provided on the metal oxide layer 103, it is preferable that a heat fusion layer is provided on the resin layer.

As the heat fusion layer, known heat fusion layers can be used. Examples thereof include a layer formed by a resin composition containing one or two or more kinds of polyolefins selected from a homopolymer or a copolymer of α-olefin such as ethylene, propylene, butene-1, hexane-1, 4-methyl-pentene-1, or octane-1, high-pressure method low density polyethylene, linear low density polyethylene (so-called LLDPE), high density polyethylene, polypropylene, a polypropylene random copolymer, a low crystalline or amorphous ethylene-propylene random copolymer, an ethylene-butene-1 random copolymer, and a propylene-butene-1 random copolymer; a layer formed by a resin composition containing an ethylene-vinyl acetate copolymer (EVA); and a layer formed by a resin composition containing EVA and a polyolefin.

(Method of Producing Metal Oxide Layer)

The metal oxide layer 103 of the present embodiment can be formed on the substrate layer 101 by reacting oxygen with metal vapor in a vacuum.

Here, since the Kα beam intensity A of the metal oxide layer 103 to be obtained depends on the amount of oxygen to be introduced so that the vapor deposition amount as a metal is decreased when the amount of oxygen to be introduced (degree of oxidation) becomes large, the Kα beam intensity A becomes small. Further, since the vapor deposition amount as a metal is increased when the amount of oxygen to be introduced is small, the Kα beam intensity A becomes large.

In addition, the vapor deposition amount of a metal oxide or a metal depends on working speed (processing speed) of the substrate layer 101 to be deposited, efficiency (vapor deposition efficiency) of adhesion of an evaporated metal to the substrate layer 101, and evaporation speed of a metal. Further, since the vapor deposition amount of a metal oxide (metal) is correlate with the light transmittance of a vapor deposition film, the light transmittance of a vapor deposition film at the time of working is decreased when the vapor deposition amount of a metal oxide (metal) is increased if the oxidation states are the same as each other.

Moreover, it is more preferable that the Kα beam intensity A of the metal oxide layer 103 to be obtained is measured by installing a fluorescence X-ray analyzer in a vapor deposition vessel because the conditions thereof can be directly managed.

In a case where a fluorescence X-ray analyzer is not installed in a vapor deposition vessel, it is preferable that a vapor deposition film is prepared by changing the working speed, the vapor deposition amount of a metal, and the amount of oxygen to be introduced using a vapor deposition device, the Kα beam intensity A and the Kα beam intensity B are measured, and the working speed, the vapor deposition amount of a metal, the amount of oxygen to be introduced, the light transmittance, and the calibration curve of the Kα beam intensity A and the Kα beam intensity B are acquired in advance.

Further, specifically, A/B can be set to be in the above-described range by controlling the amount of evaporation of a metal and the amount of oxygen to be introduced which is to be reacted. The amount of oxygen to be introduced can be controlled to be constant using a mass flow controller. It is preferable that the position for introducing oxygen that oxidizes a metal is set in an unwinding direction of a substrate and a width direction in an adhesion preventing plate such that oxygen is introduced to a rotation direction side of a cooling roll toward metal vapor. Since oxygen may be supplied only to a metal deposited on the substrate if the position is set in the above-described manner (oxygen does not need to be supplied to a metal to be adhered to the adhesion prevention plate or the like), it is possible to prevent worsening of the degree of vacuum caused by introducing extra oxygen.

In the present embodiment, a heating method during formation of the metal oxide layer 103 is not particularly limited, but it is preferable to use a high-frequency induction heating system.

It is desired that the vapor deposition rate is high within the capacity of a device at the time of production, and the vapor deposition rate is preferably in a range of 1 to 1000 m/min, more preferably in a range of 10 to 1000 m/min, and still more preferably in a range of 50 to 1000 m/min. When the vapor deposition rate is in the above-described range, the metal oxide layer can be stably produced.

The method of applying a resin having a low oxygen permeability which is provided as a resin layer is not particularly limited, and conventional methods such as an air knife coating method, a roll coating method, a gravure coating method, a blade coater method, a dip coating method, a spray coating method, a die coating method, and a lip coating method can be applied. A resin layer having low oxygen permeability can be formed by applying the coating solution and then drying the applied coating solution at a temperature of approximately 20° C. to 250° C. and performing ultraviolet curing or radiation curing.

Further, various coating layers or laminate layers, for example, a slipping layer and an antistatic layer may be further formed on the laminate film 100 of the present embodiment depending on the type of film and applications thereof.

The laminate film 100 of the present embodiment can be used for various packaging applications, for example, medical packaging applications such as an outer packaging bag for a transfusion bag; and food packaging application and industrial packaging applications for which selective permeation of water vapor is required.

Further, the laminate film 100 of the present embodiment is suitable for packaging contents such as food or pharmaceutical products which need to have oxygen barrier properties and are expected to ensure water vapor permeability. From the viewpoints that excellent oxygen barrier properties are imparted and anti-fogging effects resulting from water vapor permeability are excellent, it is particularly preferable to use the laminate film 100 as an outer packaging bag for a transfusion bag.

Next, an outer packaging bag 150 for a transfusion bag according to the present embodiment will be described.

Figure 2:
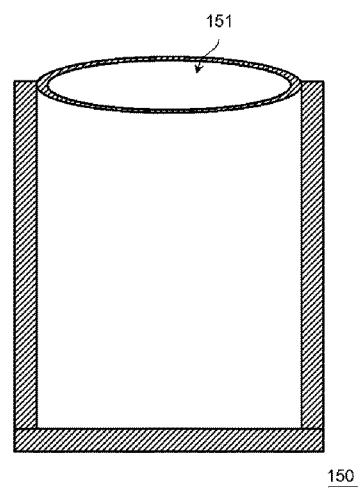
FIG. 2 is a plan view schematically illustrating an example of a structure of an outer packaging bag for a transfusion bag according to an embodiment of the present invention.

FIG. 2 is a plan view schematically illustrating an example of the structure of the outer packaging bag 150 for a transfusion bag according to the embodiment of the present invention. The laminate film 100 of the present embodiment can be used for the outer packaging bag 150 for a transfusion bag as illustrated in FIG. 2. The outer packaging bag 150 for a transfusion bag uses the laminate film 100 and the outer packaging bag can be produced using the laminate film 100 according to a known method. For example, the outer packaging bag can be produced by allowing an opening portion 151 for inserting a transfusion bag main body to remain and performing heat fusion on the peripheral edge other than the opening portion.

Next, a transfusion bag packaging body 200 according to the present embodiment will be described.

Figure 3:
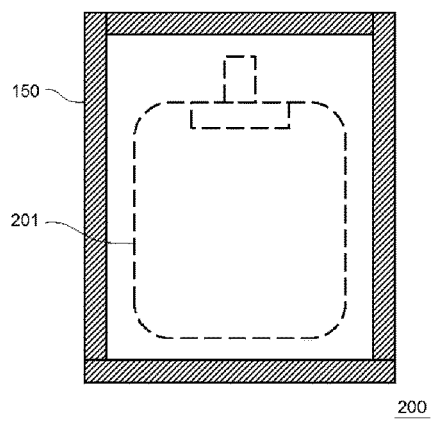
FIG. 3 is a plan view schematically illustrating an example of a structure of a transfusion bag packaging body according to an embodiment of the present invention.

FIG. 3 is a plan view schematically illustrating an example of the structure of the transfusion bag packaging body 200 according to the embodiment of the present invention. The transfusion bag packaging body 200 includes a transfusion bag main body 201 and the outer packaging bag 150 for a transfusion bag which packages the transfusion bag main body 201.

The transfusion bag packaging body 200 can be produced by inserting the transfusion bag main body 201 from the opening portion 151 of the outer packaging bag 150 for a transfusion bag and then blocking the opening portion 151 through heat fusion while performing nitrogen gas substitution or the like.

The transfusion bag main body 201 is typically a plastic container and a medical plastic container may be exemplified as the transfusion bag main body.

Examples of the contents in the transfusion bag main body 201 include a liquid chemical, a ringer solution, and a transfusion solution, which are easily degraded by oxygen such as amino acids, vitamins, and fatty lactic acid.

Since the outer packaging bag 150 for a transfusion bag has excellent water vapor permeability, moisture having permeated into the outer packaging bag 150 for a transfusion bag from the transfusion bag main body 201 can be released to the outside of the outer packaging bag 150 for a transfusion bag. In this manner, it is possible to prevent water vapor from remaining between the transfusion bag main body 201 and the outer packaging bag 150 for a transfusion bag. As the result, it is possible to prevent water droplets from being generated inside during storage of the transfusion bag packaging body 200.

Further, since the outer packaging bag 150 for a transfusion bag has excellent oxygen barrier properties even at a high humidity, it is possible to suppress deterioration of the contents in the transfusion bag main body 201 due to oxygen entering the transfusion bag main body 201 at a high humidity.

As described above, the transfusion bag packaging body 200 of the present embodiment has excellent storage stability.

Hereinbefore, the embodiments of the present invention have been described, but these are merely examples of the present invention and other various configurations can be employed.

EXAMPLES

Hereinafter, the present embodiment will be described in detail with reference to examples and comparative examples. Further, the present embodiment is not limited to these examples.

Physical properties in examples and comparative examples were measured using the following measurement method.

(1) Measurement of Water Vapor Permeability

Using laminate films obtained in the examples and comparative examples, a LLDPE film (trade name: T. U. X FCS, manufactured by Mitsui Chemical Tohcello, Inc.) having a thickness of 50 μm was coated with 3.0 g/m² of an adhesive (manufactured by Mitsui Chemicals, Inc., TAKELAC A-310 (trade mane)/TAKENATE A-3 (trade name)=12/1 (weight ratio)) and a metal oxide layer of a laminate film and the surface coated with the adhesive of the LLDPE film were laminated on each other such that the metal oxide layer and the surface were in contact with each other.

Next, a bag was prepared such that the inner surface area was set to 0.01 m² using the obtained laminate film, 10 g of calcium chloride was put into the obtained bag as the content, and then the inlet of the bag was heat-sealed.

Next, the obtained bag was stored in an environment of a temperature of 40° C. and a humidity of 90% RH. The weight of calcium chloride was measured before and after the storage and the water vapor permeability was calculated from the difference in weight. The measurement was performed every 48 hours and the value at the time when the calculated numerical value was stabilized was set as the water vapor permeability of the laminate film.

(2) Measurement of Oxygen Permeability

The oxygen permeability was measured in conformity with JIS K 7126-2:2006.

Using laminate films obtained in the examples and comparative examples, a LLDPE film (trade name: T. U. X FCS, manufactured by Mitsui Chemical Tohcello, Inc.) having a thickness of 50 μm was coated with 3.0 g/m² of an adhesive (manufactured by Mitsui Chemicals, Inc., TAKELAC A-310 (trade mane)/TAKENATE A-3 (trade name)=12/1 (weight ratio)) and a metal oxide layer of a laminate film and the surface coated with the adhesive of the LLDPE film were laminated on each other such that the metal oxide layer and the surface were in contact with each other.

Next, the oxygen permeability of the obtained laminate film was measured under conditions of a temperature of 20° C. and a humidity of 90% RH using an oxygen permeability measuring device (OXTRAN 2/21, manufactured by MOCON Inc.).

(3) Fluorescence X-ray Intensity

The Kα beams of Al of an aluminum oxide layer and an aluminum layer provided on a substrate layer were respectively measured using a fluorescence X-ray analyzer (ZSX Primus II, manufactured by Rigaku Corporation) and then the Kα beam intensity A of an aluminum oxide deposited film and the Kα beam intensity B of an aluminum deposited film obtained without introduction of oxygen were respectively measured, thereby calculating A/B.

Even in a case of silicon oxide, the Kα beams of Si of a silicon oxide layer and a silicon layer provided on a substrate layer were respectively measured using a fluorescence X-ray analyzer and then the Kα beam intensity A of a silicon oxide deposited film and the Kα beam intensity B of a silicon deposited film obtained without introduction of oxygen were respectively measured, thereby calculating A/B.

(4) Evaluation of Transfusion Bag Packaging Body

Using laminate films obtained in the examples and comparative examples, a LLDPE film (trade name: T. U. X FCS, manufactured by Mitsui Chemical Tohcello, Inc.) having a thickness of 50 μm was coated with 3.0 g/m² of an adhesive (manufactured by Mitsui Chemicals, Inc., TAKELAC A-310 (trade mane)/TAKENATE A-3 (trade name)=12/1 (weight ratio)) and a metal oxide layer of a laminate film and the surface coated with the adhesive of the LLDPE film were laminated on each other.

Next, a bag was prepared such that the inner surface area was set to 0.009 m² using a LLDPE film (trade name: T. U. X FCS, manufactured by Mitsui Chemical Tohcello, Inc.) having a thickness of 50 μm, 20 g of water was put into the obtained bag as the content, and then the inlet of the bag was heat-sealed, thereby obtaining a small bag filled with water.

Next, a bag was prepared such that the inner surface area was set to 0.022 m² using the obtained laminate film, the small bag filled with water and a humidity indicator (PHI9S5-95, manufactured by KN Laboratories, Inc.) were put into the obtained bag, and then the inlet of the bag was heat-sealed, thereby obtaining a transfusion bag packaging body.

The obtained transfusion bag packaging body was stored in an environment of a temperature of 40° C. for 3 days. When the relative humidity in the transfusion bag packaging body after the storage was less than 70% than that of the humidity indicator, this was evaluated as "O". When the relative humidity in the transfusion bag packaging body after the storage was equal to or greater than 70% than that of the humidity indicator, this was evaluated as "X".

Example 1

A biaxially stretched polyethylene terephthalate film (trade name: Emblet PET 12, manufactured by Unitika Limited.) having a thickness of 12 μm was used as a substrate. Aluminum was heated and evaporated on the surface of the substrate to which a corona treatment was applied according to a high-frequency induction heating system, oxygen was introduced, and aluminum oxide was deposited on the substrate such that A/B was set to 0.45 and the thickness thereof was set to 10 nm, thereby obtaining a laminate film (aluminum oxide deposited film). Further, aluminum was deposited on the surface of the substrate to which a corona treatment was applied under the same conditions as those for production of the aluminum oxide deposited film except that oxygen was not introduced, thereby obtaining an aluminum deposited film. The physical properties of the obtained laminate film are listed in Table 1.

Example 2

A biaxially stretched polyethylene terephthalate film (trade name: Emblet PET 12, manufactured by Unitika Limited.) having a thickness of 12 μm was used as a substrate. Aluminum was heated and evaporated on the surface of the substrate to which a corona treatment was applied according to a high-frequency induction heating system, oxygen was introduced, and aluminum oxide was deposited on the substrate such that A/B was set to 0.44 and the thickness thereof was set to 20 nm, thereby obtaining a laminate film (aluminum oxide deposited film). Further, aluminum was deposited on the surface of the substrate to which a corona treatment was applied under the same conditions as those for production of the aluminum oxide deposited film except that oxygen was not introduced, thereby obtaining an aluminum deposited film. The physical properties of the obtained laminate film are listed in Table 1.

Example 3

A laminate film was obtained by forming a resin layer formed of polyurethane on the aluminum oxide layer of the laminate film obtained in Example 1.

Here, a method of forming the resin layer is as follows. First, a polyurethane dispersion (trade name: TAKELACWPB-341 (solid content of 30%), manufactured by Mitsui Chemicals, Inc.) was diluted with a mixed solution of water and isopropyl alcohol (weight ratio: water/isopropyl alcohol=3/1), thereby preparing a coating solution (solid content of 15%). Next, the aluminum oxide layer of the laminate film obtained in Example 1 was coated with the coating solution such that the coating amount after drying was set to 0.7 g/m$^2$ using an applicator, the layer was dried, and then the solvent was removed, thereby forming a resin layer. The physical properties of the obtained laminate film are listed in Table 1.

Example 4

A laminate film was obtained by forming a resin layer formed of an ethylene-vinyl alcohol (EVOH) resin on the aluminum oxide layer of the laminate film obtained in Example 1.

Here, a method of forming the resin layer is as follows. First, the ethylene-vinyl alcohol resin (trade name: SOARNOL 16DX (solid content of 16%), manufactured by Nippon Synthetic Chemical Industry Co., Ltd.) was diluted with n-propyl alcohol, thereby preparing a coating solution (solid content of 8%). Next, the aluminum oxide layer of the laminate film obtained in Example 1 was coated with the coating solution such that the coating amount after drying was set to 1.7 g/m$^2$ using an applicator, the layer was dried, and then the solvent was removed, thereby forming a resin layer. The physical properties of the obtained laminate film are listed in Table 1.

Example 5

A laminate film was obtained by forming a resin layer formed of a polyvinylidene chloride-based resin on the aluminum oxide layer of the laminate film obtained in Example 1.

Here, a method of forming the resin layer is as follows. First, the polyvinylidene chloride-based resin (trade name: Saran Resin F216, manufactured by Asahi Chemical Industry Co., Ltd.) was diluted with a solvent having toluene and methyl ethyl ketone (MEK) at a mixing ratio of 1:2, thereby preparing a coating solution (solid content of 3%). Next, the aluminum oxide layer of the laminate film obtained in Example 1 was coated with the coating solution such that the coating amount after drying was set to 0.1 g/m$^2$ using an applicator, the layer was dried, and then the solvent was removed, thereby forming a resin layer. The physical properties of the obtained laminate film are listed in Table 1.

Example 6

At the time of forming a biaxially stretched polyethylene terephthalate film having a thickness of 12 μm, a coating agent mainly having an acrylic component was applied by means of in-lined coating as an easily adhesive layer, thereby obtaining easily adhesive PET. As the coating agent, "EPOCROS WS-300" (trade name, manufactured by Nippon Shokubai Co., Ltd., solid content of 10%) was used as an oxazoline group-containing aqueous polymer (A); "JURYMER ET-410" (trade name, manufactured by TOAGOSEI CO., LTD., solid content of 30%) was used as an aqueous acrylic resin (B); and "POLYESTER WR-961" (trade name, manufactured by Nippon Synthetic Chemical Industry Co., Ltd., solid content of 30%) was used as an aqueous polyester-based resin (C). Further, the coating agent was prepared such that the solid content ratio (A)/(B)/(C) was set to 23.7/57.2/19.1 and was applied such that the thickness after drying was set to 0.06 μm.

SiO was heated and evaporated on the easily adhesive surface of the obtained easily adhesive PET according to a high-frequency induction heating system, oxygen was introduced, and SiOx was deposited on the substrate such that A/B was set to 0.92 and the thickness thereof was set to 21 nm, thereby obtaining a laminate film (silicon oxide deposited film). Further, silicon was deposited on the easily adhesive surface of the easily adhesive PET under the same conditions as those for production of the silicon oxide deposited film except that oxygen was not introduced, thereby obtaining a silicon deposited film. The physical properties of the obtained laminate film are listed in Table 1.

Comparative Example 1

A biaxially stretched polyethylene terephthalate film (trade name: Emblet PET 12, manufactured by Unitika Limited.) having a thickness of 12 μm was used as a substrate. Aluminum was heated and evaporated on the surface of the substrate to which a corona treatment was applied according to a high-frequency induction heating system, oxygen was introduced, and aluminum oxide was deposited on the substrate such that A/B was set to 0.57 and the thickness thereof was set to 13 nm, thereby obtaining a laminate film (aluminum oxide deposited film). Further, aluminum was deposited on the surface of the substrate to which a corona treatment was applied under the same conditions as those for production of the aluminum oxide deposited film except that oxygen was not introduced, thereby obtaining an aluminum deposited film. The physical properties of the obtained laminate film are listed in Table 1.

Comparative Example 2

A biaxially stretched polyethylene terephthalate film (trade name: Emblet PET 12, manufactured by Unitika Limited.) having a thickness of 12 μm was used as a substrate. Aluminum was heated and evaporated on the surface of the substrate to which a corona treatment was applied according to a high-frequency induction heating system, oxygen was introduced, and aluminum oxide was deposited such that A/B was set to 0.57 and the thickness thereof was set to 26 nm, thereby obtaining a laminate film (aluminum oxide deposited film). Further, aluminum was deposited on the surface of the substrate to which a corona treatment was applied under the same conditions as those for production of the aluminum oxide deposited film except that oxygen was not introduced, thereby obtaining an aluminum deposited film. The physical properties of the obtained laminate film are listed in Table 1.

Comparative Example 3

A laminate film was obtained by forming a resin layer formed of polyurethane on the aluminum oxide layer of the laminate film obtained in Comparative Example 1.

Here, a method of forming the resin layer is as follows. First, a polyurethane dispersion (trade name: TAKE-LACWPB-341 (solid content of 30%), manufactured by Mitsui Chemicals, Inc.) was diluted with a mixed solution of water and isopropyl alcohol (weight ratio: water/isopropyl alcohol=3/1), thereby preparing a coating solution (solid content of 15%). Next, the aluminum oxide layer of the laminate film obtained in Comparative Example 1 was coated with the coating solution such that the coating amount after drying was set to 0.7 g/m$^2$ using an applicator, the layer was dried, and then the solvent was removed, thereby forming a resin layer. The physical properties of the obtained laminate film are listed in Table 1.

Comparative Example 4

The easily adhesive PET used in Example 6 was used as a substrate. SiO was heated and evaporated on the easily adhesive surface of the easily adhesive PET according to a high-frequency induction heating system, oxygen was introduced, and SiOx was deposited such that A/B was set to 0.99 and the thickness thereof was set to 20 nm, thereby obtaining a laminate film (silicon oxide deposited film). Further, silicon was deposited on the easily adhesive surface of the easily adhesive PET under the same conditions as those for production of the silicon oxide deposited film except that oxygen was not introduced, thereby obtaining a silicon deposited film. The physical properties of the obtained laminate film are listed in Table 1.

TABLE 1

| | Metal oxide layer | Resin layer | A/B [—] | Fluorescence X-ray intensity | | Thickness [nm] of metal oxide layer | Oxygen permeability [ml/m$^2$ · day · MPa] | Water vapor permeability [g/m$^2$ · day] | Evaluation of transfusion bag packaging body |
|---|---|---|---|---|---|---|---|---|---|
| | | | | A [kcps] | B [kcps] | | | | |
| Example 1 | Aluminum oxide | Absent | 0.45 | 17.3 | 38.1 | 10 | 10 | 5.6 | ○ |
| Example 2 | Aluminum oxide | Absent | 0.44 | 34.5 | 77.6 | 20 | 8 | 4.8 | ○ |
| Example 3 | Aluminum oxide | Polyurethane | 0.45 | 17.3 | 38.1 | 10 | 4 | 5.9 | ○ |
| Example 4 | Aluminum oxide | EVOH | 0.45 | 17.3 | 38.1 | 10 | 6 | 5.7 | ○ |
| Example 5 | Aluminum oxide | Polyvinylidene chloride | 0.45 | 17.3 | 38.1 | 10 | 5 | 3.6 | ○ |
| Example 6 | Silicon oxide | Absent | 0.92 | 28.3 | 30.8 | 21 | 5 | 3.5 | ○ |
| Comparative Example 1 | Aluminum oxide | Absent | 0.57 | 22.0 | 38.7 | 13 | 9 | 1.8 | x |
| Comparative Example 2 | Aluminum oxide | Absent | 0.57 | 44.8 | 78.0 | 26 | 6 | 1.5 | x |
| Comparative Example 3 | Aluminum oxide | Polyurethane | 0.57 | 22.0 | 38.7 | 13 | 4 | 1.2 | x |
| Comparative Example 4 | Silicon oxide | Absent | 0.99 | 27.1 | 27.4 | 20 | 4 | 0.4 | x |

From Table 1, excellent water vapor permeability and oxygen barrier properties were exhibited when the aluminum oxide deposited film had a film thickness of 10 nm and an adhesion ratio of 0.45 as shown in Example 1.

When the aluminum oxide deposited film had excellent water vapor permeability as shown in Examples 3, 4, and 5, more excellent oxygen barrier properties were able to be obtained while excellent water vapor permeability was maintained by imparting a resin layer having oxygen barrier properties as a top coating layer.

Excellent water vapor permeability and oxygen barrier properties were exhibited similar to the aluminum oxide deposited film when the silicon oxide deposited film had a film thickness of 21 nm and an adhesion ratio of 0.92 as shown in Example 6.

When the aluminum oxide deposited film was formed on the substrate layer by reacting oxygen and aluminum vapor in a vacuum, since the adhesion ratio Al was in a range of 0.20 to 0.75, a water vapor selective permeation film having excellent water vapor permeability and oxygen barrier properties was able to be obtained by selecting the layer thickness from a range of 1 to 40 nm. Similarly, when the silicon oxide deposited film was formed, since the adhesion ratio Si was in a range of 0.75 to 0.94, a water vapor selective permeation film having excellent water vapor permeability and oxygen barrier properties was able to be obtained by selecting the layer thickness from a range of 15 to 30 nm.

Further, in a transfusion bag packaging body for which laminate films obtained in Examples 1 to 6 were used, the humidity inside thereof was maintained to be low after the transfusion bag packaging body was stored at 40° C. for 3 days and water droplets were not observed inside thereof. Meanwhile, in a transfusion bag packaging body for which laminate films obtained in Comparative Examples 1 to 4, the humidity inside thereof became high after the storage.

This application claims priority based on Japanese Patent Application No. 2014-205033, filed on Oct. 3, 2014, the entire disclosure of which is incorporated herein.

The invention claimed is:

1. A transfusion bag packaging body comprising:
   a transfusion bag main body; and
   an outer packaging bag for a transfusion bag which packages the transfusion bag main body,
   wherein the outer packaging bag for a transfusion bag which is a laminate film comprising:
   a substrate layer; and
   a metal oxide layer which is provided on one surface or both surfaces of the substrate layer and contains a metal oxide,
   wherein the oxygen permeability measured under conditions of a temperature of 20° C. and a humidity of 90% RH in conformity with JIS K 7126-2:2006 is 20 ml/m²·day·MPa or less and the water vapor permeability measured under conditions of a temperature of 40° C. and a humidity of 90% RH is 2.5 g/m²·day or greater, and
   when the Kα beam intensity of a metal constituting the metal oxide which is obtained by performing fluorescence X-ray analysis on the metal oxide layer is set to A and the Kα beam intensity of the metal which is obtained by performing fluorescence X-ray analysis on a metal layer formed of the metal constituting the metal oxide is set to B, A/B is equal to or greater than 0.20 and equal to or less than 0.97.

2. The transfusion bag packaging body according to claim 1,
   wherein the metal oxide layer is an aluminum oxide layer, and
   when the Kα beam intensity of aluminum which is obtained by performing fluorescence X-ray analysis on the aluminum oxide layer is set to $A_1$ and the Kα beam intensity of aluminum which is obtained by performing fluorescence X-ray analysis on an aluminum layer formed of the aluminum is set to $B_1$, $A_1/B_1$ is equal to or greater than 0.20 and equal to or less than 0.75.

3. The transfusion bag packaging body according to claim 2,
   wherein the thickness of the aluminum oxide layer is in a range of equal to or greater than 1 nm and equal to or less than 40 nm.

4. The transfusion bag packaging body according to claim 1,
   wherein the metal oxide layer is a silicon oxide layer, and
   when the Kα beam intensity of silicon which is obtained by performing fluorescence X-ray analysis on the silicon oxide layer is set to $A_2$ and the Kα beam intensity of silicon which is obtained by performing fluorescence X-ray analysis on a silicon layer formed of the silicon is set to $B_2$, $A_2/B_2$ is equal to or greater than 0.75 and equal to or less than 0.97.

5. The transfusion bag packaging body according to claim 4,
   wherein the thickness of the silicon oxide layer is in a range of equal to or greater than 10 nm and equal to or less than 35 nm.

6. The transfusion bag packaging body according to claim 1,
   wherein the Kα beam intensity A is equal to or greater than 12 kcps and equal to or less than 40 kcps.

7. The transfusion bag packaging body according to claim 1,
   wherein a resin layer is further provided on the metal oxide layer.

8. The transfusion bag packaging body according to claim 7,
   wherein the resin layer contains one or two or more resins selected from the group consisting of a polyvinyl alcohol-based resin, a urethane-based resin, a polycarboxylic acid-based resin, a polyvinylidene chloride-based resin, and a resin formed of a polyvinyl alcohol-based resin and a polycarboxylic acid polyvalent metal salt-based resin.

9. The transfusion bag packaging body according to claim 1,
   wherein the water vapor permeability measured under conditions of a temperature of 40° C. and a humidity of 90% RH is 5.0 g/m²·day or greater.

* * * * *